US012560147B2

(12) United States Patent
Wu et al.

(10) Patent No.: US 12,560,147 B2
(45) Date of Patent: Feb. 24, 2026

(54) ANTI-STATIC AND SAND EROSION-RESISTANT COATING MATERIAL FOR WIND TURBINES AND ITS PREPARATION METHOD

(71) Applicant: MARINE CHEMICAL RESEARCH INSTITUTE CO., LTD., Qingdao City (CN)

(72) Inventors: Lianfeng Wu, Qingdao City (CN); Xianming Wang, Qingdao City (CN); Junjun Wang, Qingdao City (CN); Liang Ning, Qingdao City (CN)

(73) Assignee: MARINE CHEMICAL RESEARCH INSTITUTE CO., LTD., Qingdao City (CN)

( * ) Notice: Subject to any disclaimer, the term of this patent is extended or adjusted under 35 U.S.C. 154(b) by 0 days.

(21) Appl. No.: 19/359,678

(22) Filed: Oct. 15, 2025

(65) Prior Publication Data

US 2026/0043388 A1     Feb. 12, 2026

(30) Foreign Application Priority Data

Jun. 24, 2025    (CN) .......................... 202510850796.8

(51) Int. Cl.
| | |
|---|---|
| *F03D 1/06* | (2006.01) |
| *C08G 18/42* | (2006.01) |
| *C08K 9/02* | (2006.01) |
| *C09D 175/06* | (2006.01) |

(52) U.S. Cl.
CPC ....... *F03D 1/0675* (2013.01); *C08G 18/4277* (2013.01); *C08K 9/02* (2013.01); *C09D 175/06* (2013.01); *F05B 2280/4003* (2013.01); *F05B 2280/6011* (2013.01)

(58) Field of Classification Search
CPC ..... F03D 1/0675; C08G 18/4277; C08K 9/02; C09D 175/06; F05B 2280/4003; F05B 2280/6011
See application file for complete search history.

(56) References Cited

FOREIGN PATENT DOCUMENTS

| | | | | |
|---|---|---|---|---|
| BR | 102013008296 A2 * | 1/2015 | | |
| CN | 101333280 A * | 12/2008 | | |
| CN | 102408824 A | 4/2012 | | |
| CN | 108342113 A | 7/2018 | | |
| CN | 116803900 A * | 9/2023 | ........... | C01B 32/174 |
| CN | 119799138 A | 4/2025 | | |
| EP | 3315526 B1 * | 9/2018 | ......... | C08G 18/7837 |
| WO | WO-2012085276 A1 * | 6/2012 | ............ | C08G 18/10 |
| WO | WO-2024094900 A1 * | 5/2024 | ........... | C09D 175/04 |

* cited by examiner

*Primary Examiner* — Rabon A Sergent
(74) *Attorney, Agent, or Firm* — Cheng-Ju Chiang

(57) ABSTRACT

Disclosed is an anti-static and sand erosion-resistant coating material based on in-situ reinforcement modification of cyclodextrin modified carbon nanotubes and its preparation method. It uses specific diisocyanates for surface pretreatment of hydroxylated carbon nanotubes, and then grafts cyclodextrin onto the surface of the pretreated hydroxylated carbon nanotubes to obtain cyclodextrin modified carbon nanotubes. Subsequently, cyclodextrin modified carbon nanotubes are introduced into the synthesis process of polyurethane resin, resulting in a polyurethane resin. It further uses the polyurethane resin as component A and combines it with a curing agent to obtain an anti-static and sand erosion-resistant coating material. The anti-static and sand erosion-resistant polyurethane coating based on in-situ reinforcement modification of cyclodextrin modified carbon nanotubes has high strength, high elasticity, excellent wear resistance, high adhesion, aging resistance, and excellent anti-static function, and can meet the needs of sand erosion-resistant protection for wind turbine blades.

8 Claims, 1 Drawing Sheet

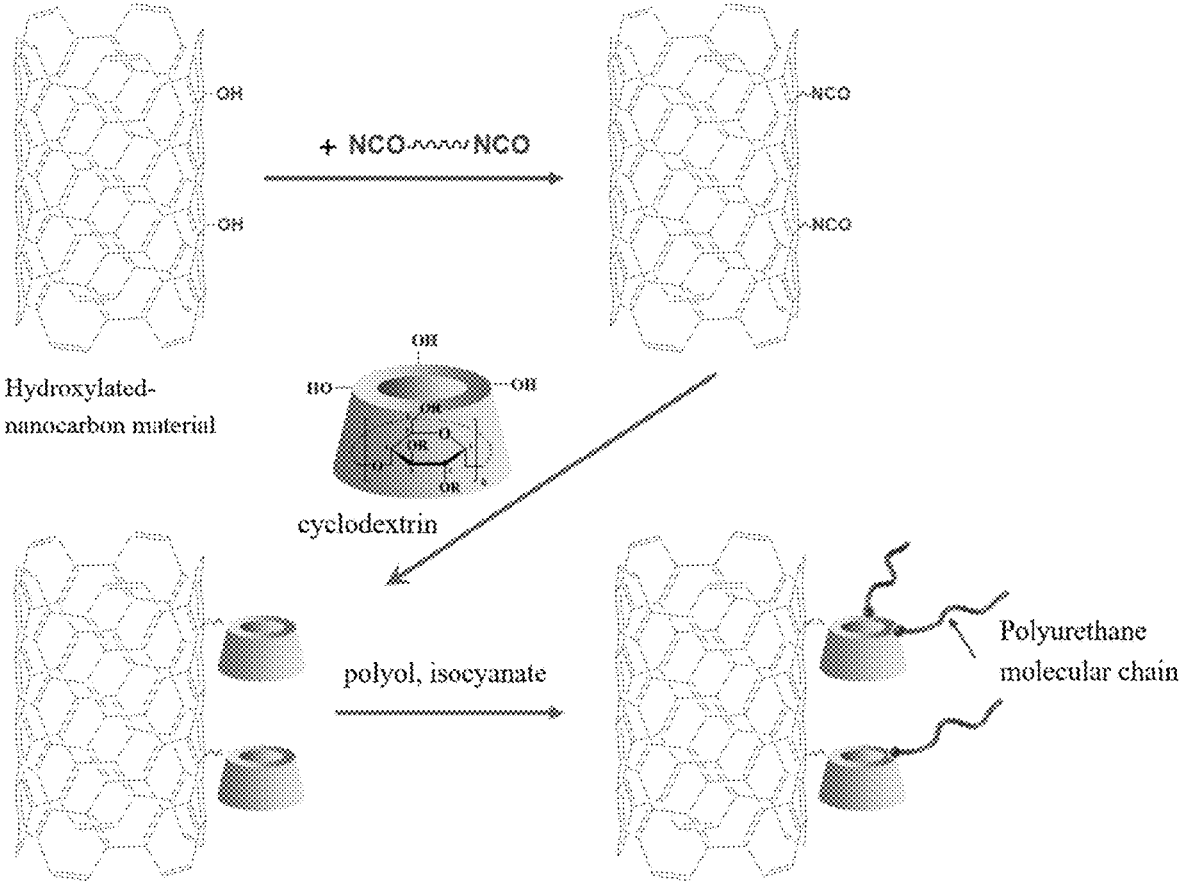
Hydroxylated-
nanocarbon material
cyclodextrin
polyol, isocyanate
Polyurethane
molecular chain

ANTI-STATIC AND SAND EROSION-RESISTANT COATING MATERIAL FOR WIND TURBINES AND ITS PREPARATION METHOD

CROSS-REFERENCE TO RELATED APPLICATIONS

This application claims priority to a Chinese Application No. 202510850796.8, filed on Jun. 24, 2025, the entire contents of which are hereby incorporated herein by reference in their entirety.

TECHNICAL FIELD

The present disclosure relates to the technical field of coating material, in particular to an anti-static and sand erosion-resistant coating material for wind turbines and its preparation method.

BACKGROUND

Wind energy is an important renewable energy source. The extensive utilization of wind energy can reduce dependence on fossil fuels, improve energy structure, protect natural resources, and promote regional economic development. It plays an important role in addressing the growing global energy demand and climate change. As the core equipment of clean energy, wind turbines have been widely used worldwide. In the first half of 2025, the cumulative installed capacity of wind power in China has exceeded 500 million kilowatts, which is an important pillar of China's energy transformation.

Wind turbine blades are one of the core components of wind turbines. During the operation of large wind turbines, the leading edge of the blades has a high linear velocity, which can reach up to 100 m/s or more. Due to the fact that most wind turbines are installed in harsh environments, wind turbine blades are subjected to long-term environmental erosion such as strong ultraviolet radiation, wind sand, rainwater, salt mist, and humid heat. Therefore, surface protection of the blades is crucial. The impact of sand particles in the environment on the surface of high-speed blades can cause serious erosion and damage to the blades, resulting in a decrease in aerodynamic performance and even damage to the composite structure of the blades, directly affecting the power generation efficiency, maintenance costs, and lifespan of wind turbines. Therefore, protective coatings for wind turbine blades need to have excellent sand erosion resistance.

In addition, when the blades rotate at high speed, they vigorously rub against particles such as dust, water droplets, and ice crystals in the air, generating static charges that accumulate continuously and form high surface voltages. The accumulation of high static voltages can interfere with the normal operation of sensors on the blades, and may even cause local corona discharge or spark discharge, causing damage to coatings or composite blades. Therefore, wind turbine blade coatings also need to have excellent anti-static properties. Therefore, a high-performance sand erosion-resistant coating with anti-static function is needed to provide corrosion protection for wind turbine blades.

In order to meet the corrosion protection requirements of wind turbine blades, high-performance sand erosion-resistant coating materials not only have high strength and elasticity, but also need to have excellent wear resistance and adhesion to ensure that the coating is not easily damaged under high-speed gravel erosion. Moreover, in order to meet the long-term protection requirements of the blades and reduce maintenance costs, high-performance sand erosion-resistant coatings also need to have excellent aging resistance. Although traditional aromatic polyurethane materials have high strength and modulus, their aging resistance and flexibility is relatively poor, which cannot meet the requirements of high strength, high elasticity, and aging resistance. Although aliphatic elastic polyurethane materials possess high elasticity and favorable aging resistance, their strength and wear resistance are relatively low, and they are unable to withstand high-speed gravel erosion.

Chinese patent application CN102408824A discloses a polyurethane coating and its preparation method. The prepared material has good wear resistance, adhesion, and weather resistance, but does not have anti-static function.

In order to achieve anti-static effect, conductive fillers need to be added to the coating. Traditional conductive fillers, such as conductive mica and conductive titanium dioxide, need to be filled in large quantities to play an anti-static role. Filling a large amount of conductive fillers will inevitably reduce the strength, wear resistance, and other properties of the coating, and cannot meet the requirements for corrosion protection of wind turbine blades. Nano-carbon materials such as carbon nanotubes have high bulk conductivity. Theoretically, anti-static effects can be achieved with low filling amounts under the premise of efficient dispersion. However, nanocarbon materials have a large specific surface area, are prone to aggregation, and are difficult to disperse. Therefore, surface modification is needed to achieve good dispersion effects in resins, thereby playing an anti-static role.

In view of above, developing a polyurethane coating with high toughness, high wear resistance, and excellent anti-static function suitable for sand erosion protection of wind turbine blades has become an urgent problem for technical personnel in this field to solve.

SUMMARY

In order to solve the technical problems of easy aggregation and difficult dispersion when carbon nanotubes are used as coatings for wind turbine blades for sand erosion and anti-static protection, the present disclosure provides an anti-static and sand erosion-resistant coating material for wind turbines and its preparation method.

The present disclosure uses specific diisocyanates for surface pretreatment of hydroxylated carbon nanotubes, and then grafts cyclodextrin onto the surface of the pretreated hydroxylated carbon nanotubes to obtain cyclodextrin modified carbon nanotubes; subsequently, cyclodextrin modified carbon nanotubes are introduced into the synthesis process of polyurethane resin, resulting in a polyurethane resin. In the synthesis process of polyurethane, polyurethane molecular segments are grown in situ on the surface of cyclodextrin modified carbon nanotubes, achieving long-term stable and uniform dispersion of carbon nanotubes in polyurethane resin, thereby making the polyurethane resin exhibit excellent anti-static properties. The present disclosure further uses the polyurethane resin as component A, in combination with a curing agent, to obtain an anti-static sand erosion-resistant coating.

The first objective of the present disclosure is to provide a high strength, high wear resistance, and excellent anti-static function of a hydroxyl-terminated macromolecular polyurethane resin.

The macromolecular polyurethane resin is prepared from raw materials including the following components:

Each component is accounted in parts by weight, 100 parts by weight of polyester polyol A;

4 to 18 parts by weight of polyether polyol A, preferably 7 to 13 parts by weight, such as 10 parts by weight;

0.5-3 parts by weight of hydroxylated carbon nanotubes, preferably 0.5-1.5 parts by weight, such as 0.8 parts by weight;

5-15 parts by weight of cyclodextrin, preferably 6-12 parts by weight, such as 8 parts by weight;

25-75 parts by weight of aliphatic isocyanate A, preferably 35-60 parts by weight, such as 50 parts by weight;

5-20 parts by weight of trimethylolpropane, preferably 8-15 parts by weight, such as 12 parts by weight;

0.3-1.0 parts by weight of catalyst A, preferably 0.5-0.75 parts by weight, such as 0.6 parts by weight;

100-150 parts by weight of organic solvent A, preferably 100-130 parts by weight, such as 120 parts by weight.

The polyester polyol A is selected from at least one of polycaprolactone diol and polycarbonate diol;

The number average molecular weight of the polyester polyol A is 500 to 2000;

The polyether polyol A is selected from at least one of polytetrahydrofuran glycol and polypropylene glycol;

The number average molecular weight of the polyether polyol A is 500 to 2000.

The hydroxylated carbon nanotubes are carbon nanotubes with hydroxyl functional groups on their surface;

The cyclodextrin is selected from at least one of α-cyclodextrin, β-cyclodextrin, and γ-cyclodextrin;

The aliphatic isocyanate A is selected from at least one of isophorone diisocyanate and 4,4'-methylenebis(cyclohexyl isocyanate);

The catalyst A is selected from at least one of dibutyltin dilaurate and organic bismuth catalysts; and The organic solvent A is selected from at least one of dimethylformamide and tetrahydrofuran.

The second objective of the present disclosure is to provide a method for preparing a hydroxyl-terminated macromolecular polyurethane resin with high strength, high wear resistance, and excellent anti-static function according to the first objective of the present disclosure.

The method for preparing the hydroxyl-terminated macromolecular polyurethane resin with high strength, high wear resistance, and excellent anti-static function includes the following steps:

S1: adding hydroxylated carbon nanotubes to a portion of organic solvent A, dispersing evenly to obtain a dispersion of carbon nanotubes, wherein the portion of the organic solvent A accounts for 20% to 30% of a total amount of the organic solvent A;

S2: under a nitrogen atmosphere, reacting the dispersion of carbon nanotubes, a portion of aliphatic isocyanate A, and a portion of catalyst A at 60-75° C. for 1-1.5 hours to obtain a pretreated carbon nanotube dispersion, wherein the portion of the aliphatic isocyanate A accounts for 5% to 8% of a total amount of the aliphatic isocyanate A, and the portion of the catalyst A accounts for 4% to 7% of a total amount of the catalyst A;

S3: adding cyclodextrin to the pretreated carbon nanotube dispersion, and reacting at 60-75° C. for 1-1.5 hours to obtain cyclodextrin modified carbon nanotube dispersion;

S4: adding polyester polyol A, polyether polyol A, remaining aliphatic isocyanate A, and remaining organic solvent A to the cyclodextrin modified carbon nanotube dispersion, and reacting at 60-75° C. for 1-1.5 hours to obtain the first intermediate product;

S5: adding a portion of catalyst A to the first intermediate product, and reacting at 80-90° C. for 2-3 hours to obtain the second intermediate product, wherein the portion of the catalyst A accounts for 63% to 66% of the weight of the catalyst A;

S6: adding trimethylolpropane and remaining catalyst A to the second intermediate product, and reacting at 80-90° C. for 2-3 hours to obtain the macromolecular polyurethane resin.

In step S2, the surface active functional group of hydroxylated carbon nanotubes, the active hydroxyl group (—OH), reacts chemically with the isocyanate group (—NCO) of aliphatic isocyanate A, converting the surface of hydroxylated carbon nanotubes into-NCO groups, facilitating the chemical grafting of hydroxylated carbon nanotubes with cyclodextrin containing hydroxyl groups in the next step.

In step S3, hydroxylated carbon nanotubes with surface converted to —NCO groups react with cyclodextrin containing hydroxyl groups. Cyclodextrin chemically grafts onto the surface of hydroxylated carbon nanotubes by reacting with —NCO groups on the surface of carbon nanotubes, achieving efficient modification of hydroxylated carbon nanotubes by cyclodextrin.

In step S4, there are still a large number of primary hydroxyl groups remaining in the cyclodextrin modified carbon nanotubes. Cyclodextrin modified carbon nanotubes are thoroughly mixed with polyester polyol A, polyether polyol A, and aliphatic isocyanate A, and undergo preliminary polymerization reaction to generate polyurethane molecular chains.

In step S5, under the action of a catalyst, cyclodextrin modified carbon nanotubes undergo further polymerization reaction with aliphatic isocyanate A along with polyester polyol A and polyether polyol A, resulting in the amplification of polyurethane molecular chains.

In step S6, under the action of a catalyst, trimethylolpropane participates in the polymerization reaction, further expanding the polyurethane molecular chain to obtain the macromolecular polyurethane resin.

Cyclodextrin molecules have a large volume cyclic rigid three-dimensional structure. When grafted onto the surface of hydroxylated carbon nanotubes, they can exhibit steric hindrance effect, effectively avoiding the aggregation of hydroxylated carbon nanotubes and significantly improving their dispersibility in the system. As a result, hydroxylated carbon nanotubes can achieve efficient anti-static effect at low dosage.

The cyclodextrin molecules in cyclodextrin modified carbon nanotubes contain a large number of primary hydroxyl groups, which can participate in the synthesis process of polyurethane resin, thereby in-situ growing polyurethane molecular segments on the surface of modified carbon nanotubes, and achieving long-term stable and uniform dispersion of carbon nanotubes in polyurethane resin. At a lower filling amount, conductive paths can be formed, significantly reducing the surface resistivity of the coating and achieving anti-static effect.

Cyclodextrin modified carbon nanotubes have a cyclic rigid three-dimensional structure, which plays a role as chemical and physical cross-linking points in the polymerization process of polyurethane resin, enhancing the in-situ modification effect of polyurethane resin, significantly improving its mechanical strength and wear resistance, and endowing the prepared coatings with excellent sand and corrosion resistance.

In the present disclosure, the synthesis process of introducing cyclodextrin modified carbon nanotubes into polyurethane resin is a continuous and uninterrupted process. That is, cyclodextrin is added to the pretreated carbon nanotube dispersion to complete the modification of carbon nanotubes. Subsequently, polyester polyol A, polyether polyol A, remaining aliphatic isocyanate A, and remaining organic solvent A are added to the cyclodextrin modified carbon nanotube dispersion to form polyurethane resin through in-situ polymerization. The present disclosure directly adds polymerization monomers such as polyester polyol A and aliphatic isocyanate A into cyclodextrin modified carbon nanotube dispersion for in-situ polymerization. During the polymerization process, polyurethane molecular chains can be directly grown in situ on the surface of cyclodextrin modified carbon nanotubes, thereby more effectively ensuring the dispersion uniformity of cyclodextrin modified carbon nanotubes in the polyurethane resin system.

The third objective of the present disclosure is to provide an anti-static and sand erosion-resistant coating based on in-situ reinforcement modification of cyclodextrin modified carbon nanotubes.

The anti-static and sand erosion-resistant coating material for wind turbines includes a component A and a component B, wherein the weight ratio of the component A and the component B is 1:0.45-0.75, preferably 1:0.5-0.6;

The component A is the macromolecular polyurethane resin prepared according the first objective or the second objective of the present disclosure; and The B component is a curing agent.

The curing agent is selected from any one or more existing curing agents that can be used for curing polyurethane resin.

Based on the structural characteristics of component A, the present disclosure further designs and synthesizes a specialized curing agent, a high molecular curing agent terminated with isocyanate groups. The isocyanate-terminated macromolecular curing agent has a similar structure to the resin main agent (component A). Compared with commercially available curing agents, the isocyanate-terminated macromolecular curing agent has better compatibility with the resin main agent, which can further improve the strength, elasticity, and wear resistance of the coating.

As a preferred solution, the curing agent is an isocyanate-terminated macromolecular curing agent prepared by the present disclosure;

The isocyanate-terminated macromolecular curing agent is prepared from raw materials including the following components:

Each component is calculated by weight:

100 parts by weight of polyester polyol B;

8-32 parts by weight of polyether polyol B, preferably 12-25 parts by weight, such as 18 parts by weight;

75-125 parts by weight of aliphatic isocyanate B, preferably 80-110 parts by weight, such as 95 parts by weight;

5-15 parts by weight of trimethylolpropane, preferably 8-15 parts by weight, such as 0.6 parts by weight;

0.3-1.0 parts by weight of catalyst B, preferably 0.5-0.75 parts by weight, such as 0.6 parts by weight;

100-150 parts by weight of organic solvent B, preferably 100-130 parts by weight, such as 110 parts by weight.

The polyester polyol B is selected from at least one of polycaprolactone diol and polycarbonate diol;

The number average molecular weight of the polyester polyol B is 500-2000;

The polyether polyol B is selected from at least one of polytetrahydrofuran glycol and polypropylene glycol;

The number average molecular weight of the polyether polyol B is 500-2000;

The aliphatic isocyanate B is selected from at least one of isophorone diisocyanate and 4,4'-methylenebis(cyclohexyl isocyanate);

The catalyst B is selected from at least one of dibutyltin dilaurate and organic bismuth catalyst;

The organic solvent B is selected from at least one of dimethylformamide and tetrahydrofuran.

The selectable range of the polyester polyol A is the same as that of the polyester polyol B. In practical implementation, polyester polyol A and polyester polyol B can be the same or different. For example, both polyester polyol A and polyester polyol B can be polycaprolactone diol, or polyester polyol A can be polycaprolactone diol and polyester polyol B can be polycarbonate diol.

The selectable range of the polyether polyol A is the same as that of the polyether polyol B. In practical implementation, polyether polyol A and polyether polyol B can be the same or different.

The selectable range of the aliphatic isocyanate A is the same as that of the aliphatic isocyanate B. In practical implementation, aliphatic isocyanate A and aliphatic isocyanate B can be the same or different.

The selectable range of catalyst A is the same as that of catalyst B. In the actual implementation process, catalyst A and catalyst B can be the same or different.

The selectable range of organic solvent A is the same as that of organic solvent B. In the actual implementation process, organic solvent A and organic solvent B can be the same or different.

The preparation method of the isocyanate-terminated macromolecular curing agent includes:

M1: under a nitrogen atmosphere, reacting polyester polyol B, polyether polyol B, trimethylolpropane, and organic solvent B at 60-75° C. for 1-1.5 hours to obtain a polyol mixture;

M2: adding aliphatic isocyanate B to the polyol mixture, and reacting at 60-75° C. for 1-1.5 hours to obtain the third intermediate product;

M3: adding catalyst B to the third intermediate product, and reacting at 80-90° C. for 2-3 hours to obtain the isocyanate-terminated macromolecular curing agent.

The anti-static sand erosion-resistant coating based on in-situ reinforcement modification of cyclodextrin modified carbon nanotubes provided by the present disclosure includes two components A and B, wherein the component A is the main agent, and the component B is the curing agent. Before use, the components A and B need to be blended evenly to cure into a coating film.

The fourth objective of the present disclosure is to provide a method for preparing an anti-static and sand erosion-resistant coating material based on in-situ reinforcement modification of cyclodextrin modified carbon nanotubes, as described in the third objective of the present disclosure.

The preparation method includes mixing the component A and the component B uniformly according to the amount described above.

The resin system including two components A and B used in the present disclosure is more suitable for the processing of industrial coatings, and the resin can cure at room temperature, making it more convenient for coating use.

The present disclosure provides an anti-static and sand erosion-resistant polyurethane coating based on in-situ reinforcement modification of cyclodextrin modified carbon nanotubes, which has high strength, high elasticity, excellent wear resistance, high adhesion, aging resistance, and excellent anti-static function, and can meet the needs of sand erosion-resistant protection for wind turbine blades.

The fifth objective of the present disclosure is to provide an application of an anti-static and sand erosion-resistant coating material based on in-situ reinforcement modification of cyclodextrin modified carbon nanotubes, as described in the third objective, in the field of anti-static and sand erosion-resistant coating materials.

Specifically, the anti-static and sand erosion-resistant coating material based on in-situ reinforcement modification of cyclodextrin modified carbon nanotubes is sprayed into a film with a spraying thickness of about 200 microns, then placing at room temperature for 14 days or curing at 80° C. for 48 hours to obtain the coating.

Compared with the existing technology, the advantageous effects of the present disclosure are shown as below.

1. The present disclosure adopts cyclodextrin to graft-modify carbon nanotubes. Due to the large volume cyclic rigid three-dimensional structure of cyclodextrin molecules, grafting them onto the surface of carbon nanotubes can exert steric hindrance effect, effectively avoiding aggregation of carbon nanotubes and significantly improving their dispersibility in the system. Cyclodextrin molecules contain a large number of primary hydroxyl groups, which can participate in the synthesis process of polyurethane resin, thereby in-situ growing polyurethane molecular segments on the surface of modified carbon nanotubes, achieving long-term stable and uniform dispersion of carbon nanotubes in polyurethane resin. At a lower filling amount, conductive pathways can be formed, significantly reducing the surface resistivity of the coating and achieving anti-static effect.

2. The present disclosure introduces cyclodextrin modified carbon nanotubes into the synthesis process of polyurethane resin for in-situ polymerization. Cyclodextrin molecules with a cyclic rigid three-dimensional structure are uniformly distributed in the resin system and combines with polyurethane resin molecules through chemical bonds, serving as crosslinking points in the polyurethane resin and forming in-situ reinforcement effects on the polyurethane resin. This significantly improves the tensile strength and wear resistance of the polyurethane resin, thereby preparing the polyurethane resin with high-strength, high elasticity, and high wear resistant.

3. The anti-static sand erosion resistant coating prepared by the present disclosure based on in-situ reinforcement modification of cyclodextrin modified carbon nanotubes can achieve a tensile strength of up to 57.5 MPa, a fracture elongation of up to 646%, a wear loss as low as 4.7 mg (under 1000 g/1000 r, CS-10), and a surface resistivity as low as 0.9 M $\Omega/\square$ (Sheet resistivity). At the same time, it also has high strength, high elasticity, excellent wear resistance, adhesion, aging resistance, and outstanding anti-static function, and can be applied to sand erosion protection in fields such as wind turbine blades, propeller blades, high-speed railways, and automobile underbodies, with broad application prospects.

BRIEF DESCRIPTION OF THE DRAWING

The FIGURE is a schematic diagram of the reaction process for preparing macromolecular polyurethane resin in Embodiments 1-7.

DETAILED DESCRIPTION OF THE EMBODIMENTS

The present disclosure will be described in detail below with reference to specific drawings and embodiments. It is necessary to point out that the following embodiments are only used for further illustration of the present disclosure and cannot be understood as limitations to the scope of the present disclosure. Some non essential improvements and adjustments made by those skilled in the art based on the content of the present disclosure still fall within the scope of the present disclosure.

The reagents used in the following embodiments and comparative examples are all commercially available products.

Hydroxylated carbon nanotubes, from Jiangsu Xianfeng Nanomaterials Technology Co., Ltd., brand name XFD02;
Polyurethane curing agent N3300, from Desmodur N3390 of Covestro;
Polyurethane curing agent N75, from DesmodurN75 from Covestro;
Isophorone diisocyanate, from Macklin (Shanghai Macklin Biochemical Co., Ltd.);
4,4'-methylenebis(cyclohexyl isocyanate), from Macklin (Shanghai Macklin Biochemical Co., Ltd.);
Organic bismuth catalyst, from Beijing Baiyuan Chemical Co., Ltd., brand MC-710;
β-cyclodextrin, from Shandong Binzhou Zhiyuan Biotechnology Co., Ltd;
Polycaprolactone diol, from Hunan Juren New Materials Co., Ltd., PCL2000 series;
Polytetrahydrofuran glycol, from Hangzhou Sanlong New Materials Co., Ltd., PTMEG series;
Polycarbonate diol, from Shandong Yuanli Technology Co., Ltd., brand YH-206;
Polypropylene glycol, from Shandong Blue Star Dongda Co., Ltd., DL series.

Embodiment 1

A polyurethane coating with high toughness, high wear resistance, and excellent anti-static function includes component A and component B. The A component is a hydroxyl-terminated macromolecular polyurethane resin, and the B component is an isocyanate-terminated macromolecular curing agent.

The preparation method of the component A hydroxyl-terminated macromolecular polyurethane resin includes the following steps:

S1: Adding 0.8 parts by weight of hydroxylated carbon nanotubes to 30 parts by weight of dimethylformamide, and sonicating while stirring in a 400 W ultrasonic cleaner for 30 minutes at a stirring rate of 150 r/min to obtain a dispersion of carbon nanotubes;

S2: Surface pretreatment of carbon nanotubes: Under a nitrogen atmosphere, adding the carbon nanotube dispersion, 3 parts by weight of isophorone diisocyanate, and 0.04 parts by weight of organic bismuth catalyst into a reaction vessel, heating the mixture at 70° C. for 1 hour to obtain the pretreated carbon nanotube dispersion;

S3: Adding 8 parts by weight of β-cyclodextrin to the pretreated carbon nanotube dispersion, heating at 70° C. for 1 hour to obtain cyclodextrin modified carbon nanotube dispersion;

S4: Adding 100 parts by weight of polycaprolactone diol with a number average molecular weight of 2000, 10 parts by weight of polytetrahydrofuran glycol with a number average molecular weight of 1000, 47 parts by weight of isophorone diisocyanate, and 90 parts by weight of dimethylformamide to the cyclodextrin modified carbon nanotube dispersion, and heating the mixture at 75° C. for 1 hour to obtain the first intermediate product;

S5: Adding 0.38 parts by weight of organic bismuth catalyst to the first intermediate product, heating at 90° C. for 2 hours to obtain the second intermediate product;

S6: Adding 12 parts by weight of trimethylolpropane and 0.18 parts by weight of organic bismuth catalyst to the second intermediate product, heating at 90° C. for 3 hours to obtain component A.

The schematic diagram of the reaction process for preparing hydroxyl-terminated macromolecular polyurethane resin is shown in the FIGURE.

The preparation method of the component B isocyanate-terminated macromolecular curing agent includes the following steps:

M1: Under a nitrogen atmosphere, adding 100 parts by weight of polycaprolactone diol with a number average molecular weight of 2000, 18 parts by weight of polytetrahydrofuran glycol with a number average molecular weight of 1000, 12 parts by weight of trimethylolpropane, and 110 parts by weight of dimethylformamide to a reaction vessel, and then heating the mixture at 70° C. for 1 hour to obtain a polyol mixture;

M2: Adding 95 parts by weight of isophorone diisocyanate to the polyol mixture, heating at 70° C. for 1 hour to obtain the third intermediate product;

M3: Adding 0.6 parts by weight of organic bismuth catalyst to the third intermediate product, heating at 90° C. for 3 hours to obtain component B.

Taking 1 part by weight of component A and 0.55 parts by weight of component B, mixing them evenly to obtain the polyurethane coating with high toughness, high wear resistance, and excellent anti-static function.

Embodiment 2

A polyurethane coating with high toughness, high wear resistance, and excellent anti-static function includes component A and component B. The A component is a hydroxyl-terminated macromolecular polyurethane resin, and the B component is an isocyanate-terminated macromolecular curing agent.

The preparation method of the component A hydroxyl-terminated macromolecular polyurethane resin includes the following steps:

S1: Adding 0.8 parts by weight of hydroxylated carbon nanotubes to 30 parts by weight of tetrahydrofuran, and sonicating while stirring in a 400 W ultrasonic cleaner for 30 minutes at a stirring rate of 150 r/min to obtain a dispersion of carbon nanotubes;

S2: Surface pretreatment of carbon nanotubes: Under a nitrogen atmosphere, adding the carbon nanotube dispersion, 3 parts by weight of 4,4'-methylenebis(cyclohexyl isocyanate), and 0.04 parts by weight of organic bismuth catalyst into a reaction vessel, heating the mixture at 70° C. for 1 hour to obtain the pretreated carbon nanotube dispersion;

S3: Adding 8 parts by weight of β-cyclodextrin to the pretreated carbon nanotube dispersion, heating at 70° C. for 1 hour to obtain cyclodextrin modified carbon nanotube dispersion;

S4: Adding 100 parts by weight of polycaprolactone diol with a number average molecular weight of 2000, 10 parts by weight of polypropylene glycol with a number average molecular weight of 1000, 47 parts by weight of 4,4'-methylenebis(cyclohexyl isocyanate), and 90 parts by weight of tetrahydrofuran to the cyclodextrin modified carbon nanotube dispersion, and heating the mixture at 75° C. for 1 hour to obtain the first intermediate product;

S5: Adding 0.38 parts by weight of dibutyltin dilaurate catalyst to the first intermediate product, heating at 90° C. for 2 hours to obtain the second intermediate product;

S6: Adding 12 parts by weight of trimethylolpropane and 0.18 parts by weight of dibutyltin dilaurate catalyst to the second intermediate product, heating at 90° C. for 3 hours to obtain component A.

The preparation method of the component B isocyanate-terminated macromolecular curing agent includes the following steps:

M1: Under a nitrogen atmosphere, adding 100 parts by weight of polycaprolactone diol with a number average molecular weight of 2000, 18 parts by weight of polypropylene glycol with a number average molecular weight of 1000, 12 parts by weight of trimethylolpropane, and 110 parts by weight of tetrahydrofuran to a reaction vessel, and then heating the mixture at 70° C. for 1 hour to obtain a polyol mixture;

M2: Adding 95 parts by weight of 4,4'-methylenebis(cyclohexyl isocyanate) to the polyol mixture, heating at 70° C. for 1 hour to obtain the third intermediate product;

M3: Adding 0.6 parts by weight of dibutyltin dilaurate catalyst to the third intermediate product, heating at 90° C. for 3 hours to obtain component B.

Taking 1 part by weight of component A and 0.55 parts by weight of component B, mixing them evenly to obtain the polyurethane coating with high toughness, high wear resistance, and excellent anti-static function.

Embodiment 3

A polyurethane coating with high toughness, high wear resistance, and excellent anti-static function includes component A and component B. The A component is a hydroxyl-terminated macromolecular polyurethane resin, and the B component is an isocyanate-terminated macromolecular curing agent.

The preparation method of the component A hydroxyl-terminated macromolecular polyurethane resin includes the following steps:

S1: Adding 0.5 parts by weight of hydroxylated carbon nanotubes to 20 parts by weight of dimethylformamide, and sonicating while stirring in a 400 W ultrasonic cleaner for 20 minutes at a stirring rate of 150 r/min to obtain a dispersion of carbon nanotubes;

S2: Surface pretreatment of carbon nanotubes: Under a nitrogen atmosphere, adding the carbon nanotube dispersion, 1.75 parts by weight of isophorone diisocyanate, and 0.02 parts by weight of organic bismuth catalyst into a reaction vessel, heating the mixture at 60° C. for 1 hour to obtain the pretreated carbon nanotube dispersion;

S3: Adding 6 parts by weight of β-cyclodextrin to the pretreated carbon nanotube dispersion, heating at 60° C. for 1 hour to obtain cyclodextrin modified carbon nanotube dispersion;

S4: Adding 100 parts by weight of polycaprolactone diol with a number average molecular weight of 1000, 10 parts by weight of polytetrahydrofuran glycol with a number average molecular weight of 2000, 33.25 parts by weight of isophorone diisocyanate, and 80 parts by weight of dimethylformamide to the cyclodextrin modified carbon nanotube dispersion, and heating the mixture at 60° C. for 1 hour to obtain the first intermediate product;

S5: Adding 0.32 parts by weight of organic bismuth catalyst to the first intermediate product, heating at 80° C. for 3 hours to obtain the second intermediate product;

S6: Adding 8 parts by weight of trimethylolpropane and 0.16 parts by weight of organic bismuth catalyst to the second intermediate product, heating at 80° C. for 3 hours to obtain component A.

The preparation method of the component B isocyanate-terminated macromolecular curing agent includes the following steps:

M1: Under a nitrogen atmosphere, adding 100 parts by weight of polycaprolactone diol with a number average molecular weight of 2000, 12 parts by weight of polytetrahydrofuran glycol with a number average molecular weight of 1000, 8 parts by weight of trimethylolpropane, and 100 parts by weight of dimethylformamide to a reaction vessel, and then heating the mixture at 60° C. for 1 hour to obtain a polyol mixture;

M2: Adding 80 parts by weight of isophorone diisocyanate to the polyol mixture, heating at 60° C. for 1 hour to obtain the third intermediate product;

M3: Adding 0.5 parts by weight of organic bismuth catalyst to the third intermediate product, heating at 80° C. for 3 hours to obtain component B.

Taking 1 part by weight of component A and 0.55 parts by weight of component B, mixing them evenly to obtain the polyurethane coating with high toughness, high wear resistance, and excellent anti-static function.

Embodiment 4

A polyurethane coating with high toughness, high wear resistance, and excellent anti-static function includes component A and component B. The A component is a hydroxyl-terminated macromolecular polyurethane resin, and the B component is an isocyanate-terminated macromolecular curing agent.

The preparation method of the component A hydroxyl-terminated macromolecular polyurethane resin includes the following steps:

S1: Adding 1.5 parts by weight of hydroxylated carbon nanotubes to 39 parts by weight of dimethylformamide, and sonicating while stirring in a 400 W ultrasonic cleaner for 30 minutes at a stirring rate of 200 r/min to obtain a dispersion of carbon nanotubes;

S2: Surface pretreatment of carbon nanotubes: Under a nitrogen atmosphere, adding the carbon nanotube dispersion, 4.8 parts by weight of isophorone diisocyanate, and 0.05 parts by weight of organic bismuth catalyst into a reaction vessel, heating the mixture at 75° C. for 1 hour to obtain the pretreated carbon nanotube dispersion;

S3: Adding 12 parts by weight of β-cyclodextrin to the pretreated carbon nanotube dispersion, heating at 75° C. for 1 hour to obtain cyclodextrin modified carbon nanotube dispersion;

S4: Adding 100 parts by weight of polycaprolactone diol with a number average molecular weight of 2000, 10 parts by weight of polytetrahydrofuran glycol with a number average molecular weight of 1000, 55.2 parts by weight of isophorone diisocyanate, and 91 parts by weight of dimethylformamide to the cyclodextrin modified carbon nanotube dispersion, and heating the mixture at 75° C. for 1 hour to obtain the first intermediate product;

S5: Adding 0.5 parts by weight of organic bismuth catalyst to the first intermediate product, heating at 90° C. for 2 hours to obtain the second intermediate product;

S6: Adding 15 parts by weight of trimethylolpropane and 0.2 parts by weight of organic bismuth catalyst to the second intermediate product, heating at 90° C. for 2 hours to obtain component A.

The preparation method of the component B isocyanate-terminated macromolecular curing agent includes the following steps:

M1: Under a nitrogen atmosphere, adding 100 parts by weight of polycaprolactone diol with a number average molecular weight of 1000, 25 parts by weight of polytetrahydrofuran glycol with a number average molecular weight of 2000, 15 parts by weight of trimethylolpropane, and 130 parts by weight of dimethylformamide to a reaction vessel, and then heating the mixture at 75° C. for 1 hour to obtain a polyol mixture;

M2: Adding 110 parts by weight of isophorone diisocyanate to the polyol mixture, heating at 75° C. for 1 hour to obtain the third intermediate product;

M3: Adding 0.75 parts by weight of organic bismuth catalyst to the third intermediate product, heating at 90° C. for 2 hours to obtain component B.

Taking 1 part by weight of component A and 0.6 parts by weight of component B, mixing them evenly to obtain the polyurethane coating with high toughness, high wear resistance, and excellent anti-static function.

Embodiment 5

A polyurethane coating with high toughness, high wear resistance, and excellent anti-static function includes component A and component B. The A component is a hydroxyl-terminated macromolecular polyurethane resin, and the B component is an isocyanate-terminated macromolecular curing agent.

The preparation method of the component A hydroxyl-terminated macromolecular polyurethane resin includes the following steps:

S1: Adding 0.8 parts by weight of hydroxylated carbon nanotubes to 30 parts by weight of dimethylformamide, and sonicating while stirring in a 400 W ultrasonic cleaner for 30 minutes at a stirring rate of 150 r/min to obtain a dispersion of carbon nanotubes;

S2: Surface pretreatment of carbon nanotubes: Under a nitrogen atmosphere, adding the carbon nanotube dispersion, 3 parts by weight of isophorone diisocyanate, and 0.04 parts by weight of organic bismuth catalyst into a reaction vessel, heating the mixture at 70° C. for 1 hour to obtain the pretreated carbon nanotube dispersion;

S3: Adding 8 parts by weight of α-cyclodextrin to the pretreated carbon nanotube dispersion, heating at 70° C. for 1 hour to obtain cyclodextrin modified carbon nanotube dispersion;

S4: Adding 100 parts by weight of polycaprolactone diol with a number average molecular weight of 2000, 10 parts by weight of polytetrahydrofuran glycol with a number average molecular weight of 1000, 47 parts by weight of isophorone diisocyanate, and 90 parts by weight of dimethylformamide to the cyclodextrin modified carbon nanotube dispersion, and heating the mixture at 75° C. for 1 hour to obtain the first intermediate product;

S5: Adding 0.38 parts by weight of organic bismuth catalyst to the first intermediate product, heating at 90° C. for 2 hours to obtain the second intermediate product;

S6: Adding 12 parts by weight of trimethylolpropane and 0.18 parts by weight of organic bismuth catalyst to the second intermediate product, heating at 90° C. for 3 hours to obtain component A.

The preparation method of the component B isocyanate-terminated macromolecular curing agent includes the following steps:

M1: Under a nitrogen atmosphere, adding 100 parts by weight of polycaprolactone diol with a number average molecular weight of 2000, 18 parts by weight of polytetrahydrofuran glycol with a number average molecular weight of 1000, 12 parts by weight of trimethylolpropane, and 110 parts by weight of dimethylformamide to a reaction vessel, and then heating the mixture at 70° C. for 1 hour to obtain a polyol mixture;

M2: Adding 95 parts by weight of isophorone diisocyanate to the polyol mixture, heating at 70° C. for 1 hour to obtain the third intermediate product;

M3: Adding 0.6 parts by weight of organic bismuth catalyst to the third intermediate product, heating at 90° C. for 3 hours to obtain component B.

Taking 1 part by weight of component A and 0.45 parts by weight of component B, mixing them evenly to obtain the polyurethane coating with high toughness, high wear resistance, and excellent anti-static function.

Embodiment 6

A polyurethane coating with high toughness, high wear resistance, and excellent anti-static function includes component A and component B. The A component is a hydroxyl-terminated macromolecular polyurethane resin, and the B component is a commercially available polyurethane curing agent N3300.

The preparation method of the component A and coating is the same as in Embodiment 1. The only difference is that the component B is replaced with the commonly available polyurethane curing agent N3300 on the market.

Embodiment 7

A polyurethane coating with high toughness, high wear resistance, and excellent anti-static function includes component A and component B. The A component is a hydroxyl-terminated macromolecular polyurethane resin, and the B component is a commonly available polyurethane curing agent N75 on the market.

The preparation method of the component A and coating is the same as in Embodiment 1. The only difference is that the component B is replaced with the commonly available polyurethane curing agent N75.

Comparative Example 1

A polyurethane coating includes component A and component B. The A component is polyurethane resin, and the B component is a large molecule curing agent with blocked isocyanate.

Compared with Embodiment 1, the difference in this comparative example is only that cyclodextrin is not added in the synthesis process of polyurethane resin (the component A), and step S3 "adding 8 parts by weight of β-cyclodextrin to the pretreated carbon nanotube dispersion, heating at 70° C. for 1 hour to obtain cyclodextrin modified carbon nanotube dispersion" is canceled. In addition, in step S4, "adding to the cyclodextrin-modified carbon nanotube dispersion" is replaced with "adding to the pre-treated carbon nanotube dispersion". The remaining parts are the same as in Embodiment 1.

The preparation method of the component B and coating is the same as in Embodiment 1.

Comparative Example 2

A polyurethane coating with high toughness, high wear resistance, and excellent anti-static function includes component A and component B. The A component is polyurethane resin, and the B component is a large molecule curing agent with blocked isocyanate.

The preparation method of the component B and coating is the same as in Embodiment 1.

Compared with Embodiment 1, the only difference in this comparative example is that carbon nanotubes and cyclodextrin are no longer introduced into the polyurethane resin synthesis process through in-situ synthesis, but are uniformly mixed with the polyurethane resin prepolymer through blending.

The preparation method of component A polyurethane resin includes the following steps:

S1: Adding 0.8 parts by weight of hydroxylated carbon nanotubes and 8 parts by weight of β-cyclodextrin to 30 parts by weight of dimethylformamide, and sonicating while stirring in a 400 W ultrasonic cleaner for 30 minutes at a stirring rate of 150 r/min to obtain a dispersion of carbon nanotubes and cyclodextrin;

S2: Under a nitrogen atmosphere, adding 100 parts by weight of polycaprolactone diol with a number average molecular weight of 2000, 10 parts by weight of polytetrahydrofuran glycol with a number average molecular weight of 1000, 50 parts by weight of isophorone diisocyanate, and 90 parts by weight of dimethylformamide to a reaction vessel, heating the mixture at 75° C. for 1 hour to obtain the first intermediate product;

S3: Adding 0.38 parts by weight of organic bismuth catalyst to the first intermediate product, heating at 90° C. for 2 hours to obtain the second intermediate product;

S4: Adding 12 parts by weight of trimethylolpropane and 0.22 parts by weight of organic bismuth catalyst to the second intermediate product, heating at 90° C. for 3 hours to obtain a hydroxyl-terminated macromolecular polyurethane resin prepolymer.

S5: Mixing the dispersion of carbon nanotubes and cyclodextrin with the hydroxyl-terminated macromolecular polyurethane resin prepolymer uniformly to obtain component A.

The preparation method of the component B isocyanate-terminated macromolecular curing agent includes the following steps:

M1: Under a nitrogen atmosphere, adding 100 parts by weight of polycaprolactone diol with a number average molecular weight of 2000, 18 parts by weight of polytetrahydrofuran glycol with a number average molecular weight of 1000, 12 parts by weight of trimethylolpropane, and 110 parts by weight of dimethylformamide to a reaction vessel, heating the mixture at 70° C. for 1 hour to obtain a polyol mixture;

M2: Adding 95 parts by weight of isophorone diisocyanate to the polyol mixture, heating at 70° C. for 1 hour to obtain the third intermediate product;

M3: Adding 0.6 parts by weight of organic bismuth catalyst to the third intermediate product, then heating at 90° C. for 3 hours to obtain the component B.

Taking 1 part by weight of the component A and 0.55 parts by weight of the component B curing agent, mixing them evenly to obtain the polyurethane coating.

Performance Testing

The coatings prepared in Embodiments 1-7 and Comparative Examples 1-2 were sprayed into films with a thickness of 200 microns and cured at 80° C. for 48 hours to obtain coatings. The performance of the coating is tested.

Tensile strength is tested in accordance with GB/T 528; The elongation at break is tested according to GB/T 528; Wear is tested according to GB/T 1768; Adhesion is tested in accordance with GB/T 5210; The surface resistivity is tested according to BMS 10-21 (block resistance method).

The test results are shown in Table 1.

TABLE 1

| Examples | tensile strength/ MPa | elongation at break/ % | Wear at 1000 g/ 1000 revo-lutions, mg | adhesion/ MPa | surface resistivity MΩ/□ |
|---|---|---|---|---|---|
| Embodi-ment 1 | 56.6 | 513 | 5.1 | 14.5 | 2.4 |
| Embodi-ment 2 | 57.5 | 468 | 4.7 | 15.3 | 0.9 |
| Embodi-ment 3 | 51.8 | 584 | 6.8 | 13.6 | 4.7 |
| Embodi-ment 4 | 52.7 | 427 | 5.5 | 14.8 | 3.5 |
| Embodi-ment 5 | 51.3 | 589 | 7.1 | 12.9 | 2.5 |
| Embodi-ment 6 | 39.7 | 646 | 25.8 | 8.4 | 8.6 |
| Embodi-ment 7 | 33.5 | 593 | 19.7 | 9.5 | 8.7 |
| Compar-ative Example 1 | 26.8 | 375 | 31.4 | 7.8 | 12.8 |
| Compar-ative Example 2 | 25.5 | 362 | 33.5 | 7.3 | 107.2 |

From the test results in Table 1, it can be seen that compared with Comparative Examples 1-2, the high-performance polyurethane coatings obtained in Embodiments 1-7 have significantly improved tensile strength, elongation at break, and adhesion, while significantly reduced wear and surface resistivity. The coating provided by the present disclosure combines high strength, high elasticity, high wear resistance, excellent adhesion, and anti-static function, and can be used for sand erosion protection of wind turbine blades.

The component A of Embodiment 1 is the same as that of Embodiments 6 and 7, with the only difference being the component B. Embodiment 1 uses the self-made curing agent of the present disclosure, while Embodiments 6 and 7 use commercially available polyurethane curing agents N3300 and N75, respectively. Compared with Embodiments 6 and 7, Embodiment 1 showed significantly improved tensile strength, elongation at break, and adhesion, while significantly reduced wear and surface resistivity. Explanation: Compared with commercially available curing agents, the self-made curing agent of the present disclosure has better compatibility and higher compatibility with the resin main agent (component A), which can further improve the tensile strength, elongation at break, and adhesion of the coating material, reduce wear and surface resistivity, and make the prepared polyurethane coating material have higher strength, elasticity, wear resistance, and anti-static performance.

The component B (curing agent) in Embodiment 1 is the same as that in Comparative Example 1, with the only difference being the component A. Embodiment 1 uses the hydroxyl-terminated macromolecular polyurethane resin prepared by the present disclosure as component A; Comparative Example 1 did not use cyclodextrin for grafting modification of carbon nanotubes, and cyclodextrin was not introduced during the synthesis of polyurethane resin. Compared with Embodiment 1, although the same amount of carbon nanotubes is added, the surface resistivity of Comparative Example 1 was significantly higher. Compared with Embodiment 1, the tensile strength, elongation at break, and adhesion of Comparative Example 1 were significantly reduced, and the wear was significantly improved. This result indicates that, on one hand, using cyclodextrin for grafting modification of carbon nanotubes can significantly improve the dispersion of carbon nanotubes in the resin, significantly reduce the surface resistivity of the coating, and enhance the anti-static function; on the other hand, cyclodextrin molecules participate in the in-situ polymerization process of polyurethane resin, acting as chemical cross-linking points in the resin, forming in-situ reinforcement effects on the resin, significantly improving the tensile strength, wear resistance, and adhesion of the coating.

The component B (curing agent) in Embodiment 1 is the same as that in Comparative Example 2, with the only difference being the A component. Embodiment 1 uses the hydroxyl-terminated macromolecular polyurethane resin prepared by the present disclosure as component A, and the raw material formula for component A of resin in Comparative Example 2 is the same as in Embodiment 1. However, during the synthesis process of the polyurethane resin, carbon nanotubes and cyclodextrin are no longer introduced via in situ polymerization but instead through blending. The tensile strength, wear, and adhesion of the polyurethane coating prepared in Comparative Example 2 were significantly lower than those in Embodiment 1, especially the surface resistivity of the coating, which increased from 2.4 MΩ/□ in Embodiment 1 to 107.2 MΩ/□, and the anti-static performance was severely degraded. This result indicates that the preparation method adopted in the present disclosure, which first grafts cyclodextrin onto the surface of carbon nanotubes and then introduces cyclodextrin modified carbon nanotubes into the synthesis process of polyurethane resin for in situ polymerization, can significantly improve the dispersion stability of carbon nanotubes in the polyurethane resin system, better build conductive paths, and significantly reduce the surface resistivity of the coating. In addition, cyclodextrin grafted modified carbon nanotubes participate in the in situ polymerization of polyurethane resin, forming an in situ reinforcement effect on the polyurethane resin, which can better improve the tensile strength, wear resistance, and adhesion of the coating.

What is claimed is:

1. A hydroxyl-terminated macromolecular polyurethane resin, wherein the macromolecular polyurethane resin is prepared from raw materials comprising the following components:

each component is accounted in parts by weight:
100 parts by weight of polyester polyol A;
4 to 18 parts by weight of polyether polyol A;
0.5-3 parts by weight of hydroxylated carbon nanotubes;
5-15 parts by weight of cyclodextrin;
25-75 parts by weight of aliphatic isocyanate A;
5-20 parts by weight of trimethylolpropane;
0.3-1.0 parts by weight of catalyst A;
100-150 parts by weight of organic solvent A.

2. The hydroxyl-terminated macromolecular polyurethane resin as claimed in claim 1, wherein:

the polyester polyol A is selected from at least one of polycaprolactone diol and polycarbonate diol;
the polyether polyol A is selected from at least one of polytetrahydrofuran glycol and polypropylene glycol;
the hydroxylated carbon nanotubes are carbon nanotubes with hydroxyl functional groups on their surface;
the cyclodextrin is selected from at least one of α-cyclodextrin, β-cyclodextrin, and γ-cyclodextrin;
the aliphatic isocyanate A is selected from at least one of isophorone diisocyanate and 4,4'-methylenebis(cyclohexyl isocyanate);
the catalyst A is selected from at least one of dibutyltin dilaurate and organic bismuth catalysts; and
the organic solvent A is selected from at least one of dimethylformamide and tetrahydrofuran.

3. The hydroxyl-terminated macromolecular polyurethane resin as claimed in claim 1, wherein:

the number average molecular weight of the polyester polyol A is 500 to 2000;
the number average molecular weight of the polyether polyol A is 500 to 2000.

4. A method for preparing the hydroxyl-terminated macromolecular polyurethane resin as claimed in claim 1, wherein the preparation method comprises:

S1: adding hydroxylated carbon nanotubes to a portion of organic solvent A, dispersing evenly to obtain a dispersion of carbon nanotubes, wherein the portion of the organic solvent A accounts for 20% to 30% of a total amount of the organic solvent A;

S2: under a nitrogen atmosphere, reacting the dispersion of carbon nanotubes, a portion of aliphatic isocyanate A, and a portion of catalyst A at 60-75° C. for 1-1.5 hours to obtain a pretreated carbon nanotube dispersion, wherein the portion of the aliphatic isocyanate A accounts for 5% to 8% of a total amount of the aliphatic isocyanate A, and the portion of the catalyst A accounts for 4% to 7% of a total amount of the catalyst A;

S3: adding cyclodextrin to the pretreated carbon nanotube dispersion, and reacting at 60-75° C. for 1-1.5 hours to obtain cyclodextrin modified carbon nanotube dispersion;

S4: adding polyester polyol A, polyether polyol A, remaining aliphatic isocyanate A, and remaining organic solvent A to the cyclodextrin modified carbon nanotube dispersion, and reacting at 60-75° C. for 1-1.5 hours to obtain the first intermediate product;

S5: adding a portion of catalyst A to the first intermediate product, and reacting at 80-90° C. for 2-3 hours to obtain the second intermediate product, wherein the portion of the catalyst A accounts for 63% to 66% of the weight of the catalyst A;

S6: adding trimethylolpropane and remaining catalyst A to the second intermediate product, and reacting at 80-90° C. for 2-3 hours to obtain the macromolecular polyurethane resin.

5. An anti-static and sand erosion-resistant coating material for wind turbines, wherein the coating material comprises a component A and a component B, the weight ratio of the component A and the component B is 1:0.45-0.75;

the component A is the macromolecular polyurethane resin as claimed in claim 1; and
the B component is a curing agent.

6. The coating material as claimed in claim 5, wherein the curing agent is an isocyanate-terminated macromolecular curing agent;

the isocyanate-terminated macromolecular curing agent is prepared from raw materials comprising the following components:
each component is calculated by weight:
100 parts by weight of polyester polyol B;
8-32 parts by weight of polyether polyol B;
75-125 parts by weight of aliphatic isocyanate B;
5-15 parts by weight of trimethylolpropane;
0.3-1.0 parts by weight of catalyst B;
100-150 parts by weight of organic solvent B.

7. The coating material according to claim 6, wherein:

the polyester polyol B is selected from at least one of polycaprolactone diol and polycarbonate diol;
the number average molecular weight of the polyester polyol B is 500-2000;
the polyether polyol B is selected from at least one of polytetrahydrofuran glycol and polypropylene glycol;
the number average molecular weight of the polyether polyol B is 500-2000;
the aliphatic isocyanate B is selected from at least one of isophorone diisocyanate and 4,4'-methylenebis(cyclohexyl isocyanate);
the catalyst B is selected from at least one of dibutyltin dilaurate and organic bismuth catalyst;
the organic solvent B is selected from at least one of dimethylformamide and tetrahydrofuran.

8. The coating material according to claim 6, wherein the preparation method of the isocyanate-terminated macromolecular curing agent comprises:

M1: under a nitrogen atmosphere, reacting polyester polyol B, polyether polyol B, trimethylolpropane, and organic solvent B at 60-75° C. for 1-1.5 hours to obtain a polyol mixture;

M2: adding aliphatic isocyanate B to the polyol mixture, and reacting at 60-75° C. for 1-1.5 hours to obtain the third intermediate product;

M3: adding catalyst B to the third intermediate product, and reacting at 80-90° C. for 2-3 hours to obtain the isocyanate-terminated macromolecular curing agent.

* * * * *